APPARATUS FOR DIGITAL COMPUTATION

Filed Aug. 27, 1949 2 Sheets-Sheet 1

Inventors:
George W. Hobbs,
William B. Jordan,
by Paul A. Frank
Their Attorney.

Oct. 26, 1954 G. W. HOBBS ET AL 2,692,727
APPARATUS FOR DIGITAL COMPUTATION
Filed Aug. 27, 1949 2 Sheets-Sheet 2

Inventors:
George W. Hobbs,
William B. Jordan,
by Paul A. Frank
Their Attorney.

Patented Oct. 26, 1954

2,692,727

UNITED STATES PATENT OFFICE 2,692,727

APPARATUS FOR DIGITAL COMPUTATION

George W. Hobbs and William B. Jordan, Scotia, N. Y., assignors to General Electric Company, a corporation of New York Application August 27, 1949, Serial No. 112,788

9 Claims. (Cl. 235—61)

Figures 1, 2, 3, 4, 6:
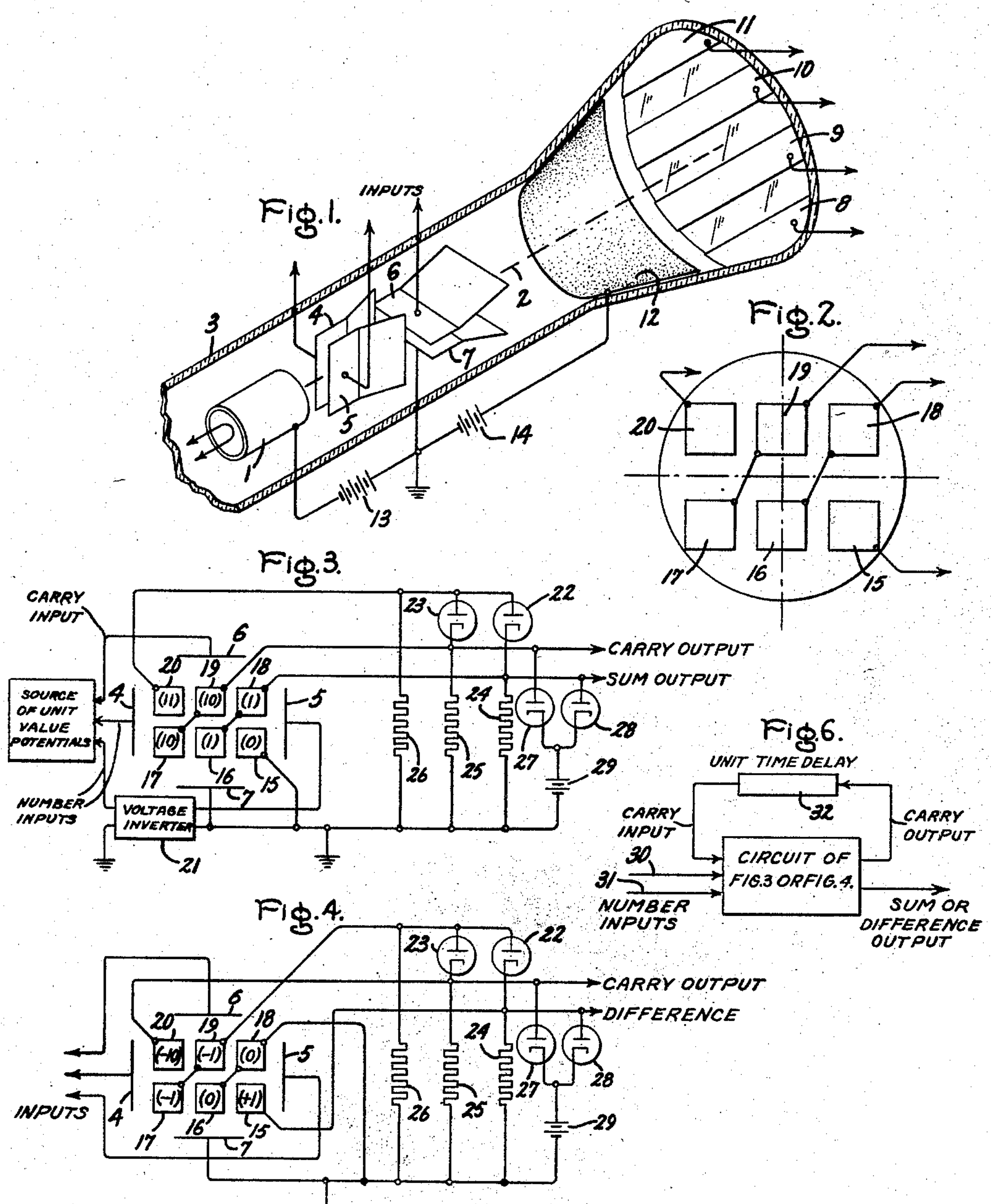

This invention relates to electronic digital computers; and in particular to improved method and apparatus for performing addition, subtraction, and gating operations in such computers.

An object of the invention is to provide improved and simplified adding, subtracting and gating apparatus for use in high speed, electronic digital computers, which is smaller and less complex than apparatus previously used for such purpose. The invention includes a novel electron beam tube in which the electron beam is selectively directed to a plurality of target electrodes, in a manner hereinafter described, to perform the desired operation.

Other objects and advantages will appear as the description proceeds.

The invention is particularly adapted for use in computers employing binary arithmetic in their operation and is herein described in terms of the binary number system.

The most common number system—the decimal system—employs ten digit-values, designated by the familiar Arabic numerals 0 through 9. In the decimal system, the number 107 expresses the quantity $1\times10^2+0\times10^1+7\times10^0$. The binary system employs only two digit-values, which may be designated by any convenient symbols, such as "yes" and "no," or "0" and "1." Using the last-named pair of symbols, the quantity $$1\times2^6+1\times2^5+0\times2^4+1\times2^3+0\times2^2+1\times2^1—1\times2^0$$

equal to 107 in the decimal system, is written in the binary system as 1101011. A partial table of corresponding decimal system numbers and binary system numbers follows:

| Decimal System | Binary System |
|---|---|
| 0 | 0 |
| 1 | 1 |
| 2 | 10 |
| 3 | 11 |
| 4 | 100 |
| 5 | 101 |
| 6 | 110 |
| 7 | 111 |
| 8 | 1000 |
| 9 | 1001 |
| 10 | 1010 |
| 64 | 1000000 |
| 100 | 1100100 |

Despite the relatively large number of columns needed to represent fairly small numbers, the binary number system is actually more efficient or economical in its use of digit-values, and hence computer components, than the more familiar decimal number system. In the decimal system, twenty digit-values, two columns of ten each, are required to represent the one hundred numbers 0 through 99. In the binary number system, twenty digit-values, ten columns of two each, can represent one thousand and twenty-four different numbers.

Binary arithmetic is especially adapted for use in electronic digital computers since the two digit-values can be represented by qualitatively, rather than merely quantitatively, different electrical states: for example, the "on" and "off" positions of an electronic switch, positive and negative electric pulses, or the presence and absence of electric pulses at selected times and places. A "pulse" and "no pulse" representation, in which the absence of an electric pulse represents the digit 0 and the presence of such a pulse represents the digit 1, will be used for illustrative examples in the following description; but it should be understood that the invention is not limited to this system of representation.

Binary numbers can be added column by column just as the more common decimal numbers are added. For example, in the decimal system we add $$\begin{array}{r}11\\+14\\\hline25\end{array}$$

In the binary system we add these same quantities $$\begin{array}{r}1011\\+1110\\\hline11001\end{array}$$

In the first column from the right, 1 plus 0 is 1; in the second column, 1 plus 1 is 10, or 0 with 1 to carry; in the third column, 1 (carried) plus 0 plus 1 is 10, or again 0 with 1 to carry; in the fourth column, 1 (carried) plus 1 plus 1 is 11. It is thus apparent that a device to add one column of two binary numbers requires three inputs, one for each of the two digit-values to be added together plus one for the carry digit-value from the preceding column; and that it must provide two outputs, one for the sum digit-value for that column and a second for the carry digit-value to be added into the next column.

Subtraction can be performed in a similar manner. For example, in the decimal system $$\begin{array}{r}13\\-11\\\hline2\end{array}$$

In the binary system $$\begin{array}{r} 1101 \\ -1011 \\ \hline 10 \end{array}$$

In the first column from the right, 1 minus 1 is 0; in the second column, to subtract 1 from 0 requires a negative carry into the next column, that is, 1 from 10 is 1, and −1 is carried into the next column. In the third column, 1 minus 0 minus 1 (carried) is 0; and in the fourth column, 1 minus 1 is 0.

Figure 7:
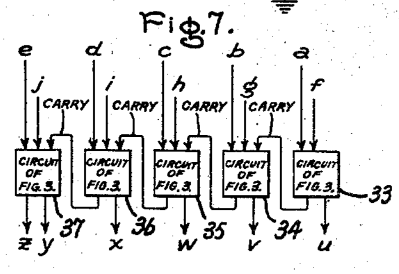
Figure 5:
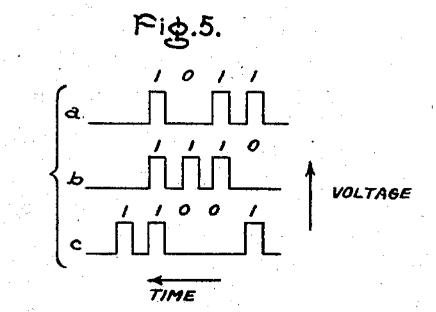
Figure 8:
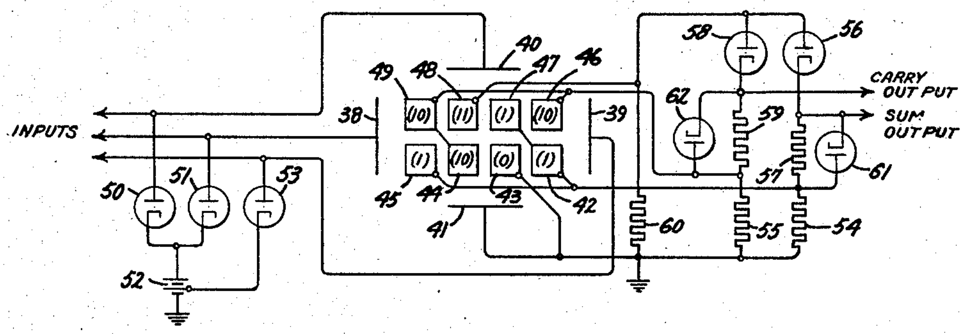
Figure 9:
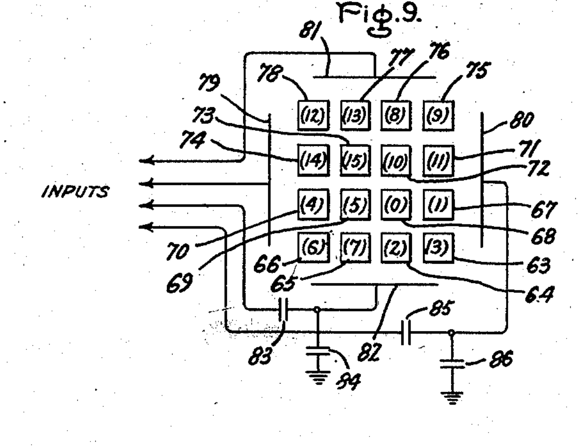

The features of the invention which are believed to be novel and patentable are pointed out in the claims. For a better understanding of the invention, reference is made in the following description to the accompanying drawings, in which Fig. 1 is a schematic view, partly in section, of an adding and subtracting tube constructed according to principles of this invention; Fig. 2 is a schematic view of an alternate target arrangement for the tube shown in Fig. 1; Fig. 3 is a schematic diagram of a circuit for an adding device; Fig. 4 is a schematic diagram of a circuit for a subtracting device; Fig. 5 illustrates a method of representing binary numbers by series of voltage pulses in time sequence; Fig. 6 is a schematic diagram showing how the circuit of Fig. 3 or the circuit of Fig. 4 can be connected in a digital computer to add or subtract, as the case may be, successive columns of two binary numbers sequentially; Fig. 7 is a schematic diagram showing how a plurality of the circuits shown in Fig. 3 can be connected together in a digital computer to add successive columns of two binary numbers simultaneously; Fig. 8 is a schematic diagram of another circuit for an adding device; and Fig. 9 is a schematic view of a target arrangement for a gating tube.

Referring now to Fig. 1, an electron gun 1 of conventional design provides an electron beam, represented by dashed line 2, within an evacuated envelope 3. Horizontal deflecting plates 4 and 5, and vertical deflecting plates 6 and 7, are positioned to deflect the electron beam horizontally and vertically, respectively, responsive to electric potentials applied to these plates, in a manner similar to the deflection produced by like deflecting plates in a conventional cathode ray oscillograph tube. In the operation of the present device, however, it is contemplated that potentials of predetermined discrete values only will be applied to the respective deflecting plates; that is, a deflecting potential of predetermined unit value will either be present or not present at each plate. Beam 2 will therefore be deflected by discrete amounts horizontally or vertically or both along one of a plurality of fixed paths, as hereinafter explained.

A plurality of targets 8, 9, 10, and 11 are positioned and arranged at one end of tube 3 so that beam 2 strikes different ones of such targets when the beam is deflected by different discrete amounts. These targets may be strips of metal, or other electrically conducting material, disposed diagonally across the large end of envelope 3. Electrical connections extending outside the envelope are attached to each target as shown. Preferably, a collector electrode 12, which may be an electrically conducting coating applied to the inside of envelope 3, is provided and maintained at a slightly positive potential with respect to the target electrodes, to collect and remove secondary electrons emitted when the electron beam strikes the targets. Conventional means, represented in the drawing by batteries 13 and 14, are provided to maintain the various electrodes at their proper relative operating potentials.

Preferably, the tube is designed to operate with relatively high currents in the electron beam, in the order of several milliamperes, and relatively low electric potentials, 400 volts for example, between the cathode of gun 1 and anode 12. Focusing of the beam may be poor compared to that in cathode-ray oscillograph tubes, since the targets are relatively large in area.

The arrangement of targets 8, 9, 10, and 11 is such that each discrete unit deflection of beam 2, either horizontally to the left or vertically upward, shifts the beam to the next target. For example, if the beam originally strikes target 8, and is then deflected one unit either to the left or upward, the beam will thereupon strike target 9. If deflected two units to the left and one unit upward, the beam will strike target 11.

An equivalent arrangement is shown in Fig. 2, in which the targets consist of six target elements, 15, 16, 17, 18, 19, and 20. Target element 15, Fig. 2, occupies substantially the same relative position as target 8, Fig. 1. Target elements 16 and 18 are connected together, and together occupy the same relative position as target 9. Target elements 17 and 19 are connected together, and together occupy the same relative position as target 10. And target element 20 occupies the same relative position as target 11. Thus, the target elements in Fig. 2 are connected together in one diagonal direction to form diagonally disposed targets which are equivalent to the targets shown in Fig. 1.

Referring now to Fig. 3, the operation of the adding and subtracting tube connected in the circuit of an adding device will be explained. Input potentials representing two binary digit-values to be added and a carry digit-value are applied to deflecting plates 4, 5, and 6, respectively. The means supplying these potentials is represented in Fig. 3 as a "source of unit value potentials." In actual practice, such means may be various parts of a complex electronic digital computer.

A potential of unit value applied to one of the deflecting plates may represent the digit 1 on that input, while zero applied potential may represent the digit 0. The following explanation will assume positive input potentials, although it will be readily apparent that the apparatus can be easily modified to accommodate negative input potentials; for example, by moving each deflecting plate to the opposite side of the electron beam, or by an equivalent change of connections. A voltage inverter 21 is provided so that a positive input potential will produce a negative potential on deflecting plate 5, whereas positive potentials are applied directly to plates 4 and 6.

It is assumed that all input potentials have a substantially uniform unit value, sufficient to deflect the electron beam one discrete unit to the next target. Suitable limiting means to insure this condition should precede the adding circuit, if needed. Such limiting means are shown at 50, 51, and 53, Fig. 8. Some variation in value of the input potentials is permissible due to the width of the targets since, if the electron beam normally strikes the center of a target, moderate deviations from normal value of the deflecting potential will not prevent the beam from still striking the same target.

The position and configuration of the various electrodes and the steady-state potentials applied thereto are so adjusted that with zero input potential on all of the deflecting plates, beam 2 strikes target 15. It will be understood that the input potentials are generally in the form of voltage pulses, which may be superimposed upon steady-state potentials of any desired value, supplied by conventional means, not shown.

Target 15 represents the digit 0 and produces no output voltage. If a positive unit input potential is applied to plate 4, beam 2 is deflected one unit amount to the left and strikes target 16. This produces a voltage in the "sum" output circuit of an output circuit means and represents the digit 1. If there is no input potential on plate 4, but a negative unit potential is applied to plate 5, beam 2 is deflected the same amount to the left as before, and again strikes target 16. If, however, a positive potential is applied to plate 4, and a negative potential is applied simultaneously to plate 5, beam 2 is deflected substantially twice as far to the left, and strikes target 17. This produces a voltage in the "carry" output circuit of the output circuit means and represents the binary number 10, equal in the binary system to 1+1. If a positive potential is applied to plate 6, beam 2 is deflected into the upper row of targets, and strikes target 18, 19, or 20, depending upon the potentials at plates 4 and 5.

It is evident that each target element in the upper row represents a number one greater than that represented by the target element immediately below it in the lower row, and that the proper output is produced by connecting each target element in the upper row to the target element diagonally below it and to its left, so that each complete target is, in effect, diagonally disposed across the end of the tube. The target arrangement shown in Fig. 1 obviously gives the same result.

As an aid in understanding the operation of the circuits, each target element of Figs. 3, 4, and 8 is labeled with the binary number represented by output voltages produced when the electron beam strikes that target element. These numbers are placed in parentheses to distinguish them from the reference numbers of the drawing.

When the electron beam strikes target 20, responsive to unit potentials on all three inputs simultaneously, the binary number 11 must be represented in the output. This requires a voltage in both the "sum" and "carry" output circuits, and accordingly target 20 is connected to both outputs through rectifying devices 22 and 23, which may be diode vacuum tubes as illustrated. These rectifying devices are provided to decouple the two outputs from each other, to prevent a voltage in one of the outputs being transmitted to the other output as would occur if target 20 were directly connected to both outputs.

Load impedances 24, 25, and 26 provide a current path to prevent an excessive accumulation of charges on the targets and to permit each target to discharge when the electron beam no longer strikes it. The load impedances may be connected to ground, as shown, so that the target electrodes are normally at ground potential; in which case electron gun 1 is maintained at a sufficiently negative potential, as illustrated in Fig. 1, to produce the required relative potentials of the respective electrodes within the tube. As electrons strike one of the targets, an electric charge is built up on that target which causes current to flow through its associated load impedance and produces a voltage in the output circuit or circuits to which it is connected.

Either positive or negative output voltages may be produced as desired by proper choice of material for the targets. It is known that when electrons strike a target at sufficient velocities, the target tends to emit other or secondary electrons. If the targets emit few secondary electrons, as may occur when the targets are constructed of aluminum or an equivalent material, each target becomes negative when the electron beam strikes it, and negative output voltages result. If, however, a material such as antimony-caesium ($SbCs_3$) is used, the number of secondary electrons emitted exceeds the number of primary electrons striking the target, the target becomes positively charged, and positive output voltages result. By choosing a material which, on the average, emits many secondary electrons for each primary electron, considerable amplification can be obtained and relatively large positive output voltages can be produced.

Emission of secondary electrons also depends upon the velocity of the primary electrons, hence upon the potential difference between the electron gun and the targets, and upon the surface condition of the targets. The manner in which these factors can be controlled to influence secondary emission in the desired way is known in the art. The circuit arrangement illustrated in the drawing is for positive output voltages resulting from targets which emit many secondary electrons. For negative output voltages, rectifiers 22 and 23 should be reversed.

As described thus far, the circuit will produce much smaller output voltages when the beam strikes target 20 than when it strikes targets 16—19. This happens because the tube is substantially a constant-current device; and the output impedance when the beam strikes target 20 comprises resistors 24, 25, and 26 in parallel, while for targets 16—19 the output impedance comprises only one of these resistors. To equalize the output voltages, clipping means comprising diode rectifiers 27 and 28 and bias voltage supply 29 may be provided. Diodes 27 and 28 conduct current whenever the output voltages exceed the voltage of bias supply 29, and thus limit all output voltages to substantially the bias voltage value. Other means for equalizing the output voltages may be employed, such as circuits which present equal output impedances to all targets (such a circuit is shown in Fig. 8 and described hereinafter), or target 20 may be made of material having a larger secondary emission ratio than the other targets, so that a larger current is provided when the beam strikes target 20, to compensate for the impedance differences.

As an example of the operation of the adding circuit of Fig. 3, suppose the binary addition $$\begin{array}{r} 1011 \\ +1110 \\ \hline 11001 \end{array}$$

is to be performed. Assume that potentials representing digit-values of the first number to be added are applied to plate 4, potentials representing digit-values of the second number are applied to plate 5, and potentials representing the carry digit-values are applied to plate 6. Starting with the first column from the right, a unit potential representing the digit 1 is applied to plate 4, since the right-hand digit of the first number is 1, and zero potentials are applied to plates 5 and 6, since the right-hand digit of the second number and the carry digit are both 0. The electron beam is deflected one unit to the left and strikes target 16. The electrons striking target 16 cause the emission of secondary electrons and thus build up a positive electric charge on the target, which causes current flow through load impedance 24 and produces a voltage in the "sum" output circuit. This indicates that the digit in the right-hand column of the sum of the two numbers is 1. There is no voltage produced in the "carry" output, so the carry digit is 0.

Proceeding now to the second column from the right, unit potentials are applied to both plates 4 and 5 since the digit in that column is 1 for both numbers to be added. The electron beam is deflected accordingly and strikes target element 17. A voltage is produced in the "carry" output, indicating that the digit 1 must be carried and added into the next column. There is no voltage produced in the "sum" output so the sum digit for that column is 0.

Proceeding now to the third column from the right, plate 4 is at zero potential, but a unit potential is applied to plate 5 since the respective digits to be added are 0 and 1. A unit potential is also applied to plate 6 to represent the digit 1 carried from the preceding column. The beam now strikes target 19, and again a voltage is produced in the "carry" output and no voltage is produced in the "sum" output. Therefore, the sum for this column is 0, with 1 to carry.

Proceeding now to the fourth column from the right, unit potentials are applied to all three inputs since all three digits represented are 1, and the electron beam strikes target element 20. Current flows through load impedance 26, and the resulting voltage is transmitted by rectifiers 22 and 23 to both the "sum" and the "carry" output circuits. Thus the sum digit for this column is 1, with 1 to carry.

For the fifth column from the right, plate 6 receives a unit potential representing the carry digit-value, while plates 4 and 5 are at zero potential since the digits represented thereby are both 0. The electron beam strikes target element 18, and a sum digit of 1 is indicated by a voltage in the "sum" output.

In Fig. 4, a subtracting circuit is shown. By comparing the circuits of Fig. 3 and Fig. 4, it can be seen that only slight changes in the circuit connections are required to convert the adding circuit to a subtracting circuit and that these changes are all exterior to the tube and hence easily made. It is also necessary to readjust the steady-state potentials of the electrodes so that, when there is no input potential present on the deflecting plates, the undeflected electron beam strikes target 16.

The potentials representing the minuend are applied to plate 5. The potentials representing the subtrahend are applied to either plate 4 or plate 6, and the carry input potentials are applied to the other of the two plates 4 and 6. A positive potential applied to plate 5 deflects beam 2 to the right so that the beam strikes target 15, which in turn produces a voltage representing the digit 1 in the "difference" output. If there is zero potential upon plate 5 and a positive potential is applied to plate 4, the beam strikes target 17 and produces voltages in both outputs, which represents a difference of 1 and a carry of −1. When a positive potential is applied to plate 6, the beam is deflected into the upper row of targets and the output voltages represent a number one smaller than the number represented when the beam strikes the corresponding target in the lower row. Thus, when the beam strikes target 20, a voltage is produced in the "carry" output and no voltage is produced in the "difference" output, which represents the binary number −10.

As an example of the operation of this subtracting circuit, Fig. 4, suppose the binary subtraction $$\begin{array}{r} 1101 \\ -1011 \\ \hline 10 \end{array}$$

is to be performed. Potentials representing digit-values of the minuend are applied to plate 5; voltages representing digit-values of the subtrahend are applied to plate 4; and potentials representing negative carry digit-values are applied to plate 6. Starting with the first column from the right, positive unit potentials are applied to both plates 4 and 5 to represent the right-hand digit-values of the subtrahend and the minuend, respectively. Plate 5, when at positive potential, tends to deflect the electron beam to the right, while plate 4, when at positive potential, tends to deflect the beam to the left. Both plates being at equal positive potentials, their deflecting effects neutralize each other, and the beam continues to strike target 16, which was its original or "zero-value" path. Since the difference between the minuend digit and the subtrahend digit is zero, no voltage is produced in either of the output circuits.

Proceeding now to the second column of digit-values from the right, plate 4 is at a positive potential since the subtrahend digit is 1, but plate 5 is at zero potential since the minuend digit is 0. The electron beam is deflected to the left and strikes target 17. This produces voltages in both output circuits, representing a difference digit of 1 for that column and a negative carry of 1 to be subtracted from the next column.

Proceeding to the third column from the right, plate 5 is at positive potential and plate 4 is at zero potential to represent digits of 1 and 0 in the minuend and the subtrahend respectively; and plate 6 is at positive potential to represent the negative carry of 1. The electron beam then strikes target 18 and produces no voltage in either output, which represents a difference digit of 0, and 0 to carry.

In the fourth column, plates 4 and 5 are at equal positive potentials, and the electron beam strikes target 16, which produces no output voltages.

Since either addition or subtraction can be performed by a simple change of circuit connections, the device described can perform algebraic addition of both positive and negative numbers.

In one form of digital computer, successive digit-values of a binary number are represented in time sequence by a series of electric pulses, which may be transmitted over a single wire or recorded upon a single tape. In such a sequence, the first pulse time-position represents the digit-value to appear in the first column from the right, the second pulse time-position represents the digit-value in the second column, etc. The presence of a pulse in any time-position may represent the digit 1, and the absence of such a pulse may represent the digit 0. This is illustrated in Fig. 5. In Fig. 5*a*, a series of voltage pulses representing the binary number 1011 are shown.

Similarly, Figs. 5b and 5c show series of voltage pulses representing the binary numbers 1110 and 11001, respectively.

Referring now to Fig. 5a, the right-hand pulse in the illustration, which is the first pulse in time, represents the right-hand digit 1 of the number 1011. Similarly, the second pulse from the right represents the second digit from the right, also 1. Next there is an interval or time-position in which there is no pulse (or, alternatively, a negligibly small pulse or a negative pulse) which represents the digit 0. Then there is another pulse which represents the fourth digit from the right, which is 1.

Connections by which the circuits of Figs. 3 and 4 can be used in such a computer are shown in Fig. 6. Suppose the function of addition is to be performed: then the circuit of Fig. 3 is used. The numbers to be added are represented by series of voltage pulses arriving simultaneously on inputs 30 and 31. These inputs are any two of the inputs of the Fig. 3 circuit. The third input of Fig 3 is used for the carry. The "carry" output of the Fig. 3 circuit is connected through a unit-time-delay circuit 32, as shown in Fig. 6, and then back to its own "carry" input. The time-delay circuit may be an electrical network in which the time required for an electric pulse to travel through the network is substantially equal to the time interval between successive pulses. Thus, whenever a voltage pulse appears in the "carry" output indicating that the digit 1 is to be carried into the next column, this pulse is delayed one unit of time in passing through the unit delay circuit and arrives at the "carry" input at exactly the same time that pulses representing digit-values in the next column of the two numbers added arrive at their respective inputs. One adding device thus successively adds each column, and the sum appears as a series of voltage pulses in time sequence at the "sum" output.

If the circuit of Fig. 4 is used in place of the circuit of Fig. 3, the operation is the same except that the output is the difference of the two numbers.

As an example, suppose an adding circuit, Fig. 3, is connected in the circuit of Fig. 6, and that the two binary numbers 1011 and 1110 are to be added. These two numbers will be represented by series of voltage pulses as illustrated in Fig. 5a and Fig. 5b, respectively. Suppose that the pulses representing 1011 arrive over input 30, while the pulses representing 1110 arrive at the same time over input 31. Each time a voltage pulse arrives at either input, the deflecting plate connected to that input receives a unit positive potential, and voltages representing the sum and carry digit-values are produced in the output circuits, as hereinbefore explained.

During the first time interval, a pulse arrives at input 30 which represents the right-hand digit 1 of the number 1011. There is no pulse on input 31 since the right-hand digit of 1110 is 0. The adding circuit responds to the voltages on the inputs in the manner hereinbefore described and produces a voltage in the "sum" output circuit, which represents a sum digit 1 in the right-hand column.

During the second time interval, a voltage pulse arrives on both inputs. Accordingly, the adding circuit produces no voltage in the "sum" output circuit, representing the sum digit 0 in the second column from the right, but produces a voltage in the "carry" output, representing the carry digit 1 which must be added into the next column of digit-values. This voltage in the "carry" output passes through unit-time-delay circuit 32, whereby it is delayed one time interval, and is then applied to the "carry" input during the third time interval. Also during the third time interval, a voltage pulse arrives at input 31, but no pulse arrives at input 30. Again the adding circuit produces no voltage in the "sum" output circuit but produces a voltage in the "carry" output circuit, which is delayed one time interval as before and is applied to the carry input during the fourth time interval. Also during the fourth time interval, voltage pulses arrive on both number inputs 30 and 31. Accordingly, the adding circuit produces voltages in both the "sum" and the "carry" outputs. During the fifth time interval, only the "carry" input receives a pulse, and a voltage is produced in the "sum" output circuit.

The voltages produced in the "sum" output circuit during the five time intervals discussed constitute the series of voltage pulses shown in Fig. 5c. These pulses represent the binary number 11001, which is the sum of the two binary numbers 1011 and 1110.

Sometimes the speed with which the operation must be performed requires that columns be added substantially simultaneously rather than in sequence. An arrangement whereby this may be done is shown in Fig. 7. In this circuit, two five-digit binary numbers *edcba* and *jihgf* are to be added to obtain their sum, which in general may be expressed as a six-digit number *zyxwvu*.

In this arrangement, voltage pulses representing each digit-value of each number are transmitted substantially simultaneously over different wires. To add five-digit numbers requires five adding devices of the type shown in Fig. 3, which are represented in Fig. 7 by the boxes 33, 34, 35, 36, and 37. The "carry" output of box 33 is connected to the "carry" input of box 34, and the "carry" output of box 34 is connected to the "carry" input of box 35, etc. The "carry" output of box 37 transmits the sixth digit-value of the sum. Since these adding circuits operate almost simultaneously, there is substantially no delay in transmitting the carry from one column to the next: provided the number of columns is reasonably small no corrective means is necessary. Where the number of columns is large, suitable delay devices must be employed to insure that all signals arrive at the various adding devices in proper time relation to one another.

Here again, if subtraction is to be performed, a Fig. 4 circuit is substituted for each Fig. 3 circuit.

As an example, suppose the binary numbers 11011 and 1110 are to be added. Voltage pulses representing the 1 digit-value of number 11011 arrive simultaneously at inputs *e*, *d*, *b*, and *a*, respectively. No pulse arrives at input *c*, since the digit 0 is represented on that input. Similarly, and at the same time, pulses arrive at inputs *i*, *h*, and *g* to represent the number 1110. Almost instantaneously, carry digits are represented by voltages transmitted from adding circuit 34 to circuit 35, from 35 to 36, and from 36 to 37. Voltages are then produced in output circuits *z*, *x*, and *u*, representing the binary number 101001, which is the sum of 11011 and 1110.

It will be appreciated that modifications can be made in the tube structure and circuits. For example, an alternate target structure and an appropriate circuit therefor are shown in Fig. 8, which eliminate the need for a voltage inverter, such as 21 in the adding circuit of Fig.

3. Referring now to Fig. 8, inputs are connected to horizontal deflection plates 38 and 39, and to vertical deflection plate 40. The other vertical deflection plate 41 may be connected to ground.

Eight target elements, 42 through 49, are arranged in two rows of four each, as shown. Targets 42, 45, and 47 are connected together, as are targets 44, 46, and 49. With zero potential on all deflecting plates, the undeflected electron beam strikes target 43. The electrodes of the tube are so constructed and spaced that unit positive potential applied to plate 38 shifts the electron beam two targets to the left. Unit positive potential applied to plate 40 shifts the beam into the upper row of targets. Limiting means, comprising diode rectifiers 50 and 51 and bias voltage supply 52, limit the potentials applied to plates 38 and 40 to unit value. A diode rectifier 53, connected to an intermediate terminal of bias voltage supply 52, limits potential applied to plate 39 to one-half unit value so that potentials applied to plate 39 shift the electron beam just one target to the right. The binary numbers shown in parentheses on the face of each target indicate the number of deflecting plates to which positive potentials are applied to cause the beam to strike that target.

When positive potential is applied at one input only, the electron beam strikes target 42, 45, or 47, and current flows through resistor 54. This produces a voltage in the "sum" output circuit. When positive potentials are applied to two inputs, the electron beam strikes target 44, 46, or 49, and current flows through resistor 55. This produces a voltage in the "carry" output circuit. When positive potential is applied to all three inputs, the electron beam strikes target 48. Current then flows through rectifier 56, resistor 57, and resistor 54 in series, and also through rectifier 58, resistor 59, and resistor 55 in series, and through resistor 60. This produces voltages in both output circuits.

Preferably, resistors 54, 55, 57, and 59 are equal in value, and resistor 60 has a much higher resistance than the others. This arrangement presents substantially the same impedance to each of the targets 42, 44–49, and thereby provides uniformity in value of the output voltages. To further insure equality of impedances under all conditions, rectifiers 61 and 62 may be connected in parallel with resistors 57 and 59, respectively, as shown, but these extra rectifiers are generally not necessary when the outputs are connected to high impedance circuits.

Another means of eliminating voltage inverter 21 from the Fig. 3 circuit is to provide two pairs of horizontal deflecting plates, or what is equivalent, split plate 4, Fig. 3, into two parts. An input can then be connected to each part of plate 4, and plate 5 can be grounded.

Tubes similar to those described can also be used in switching and gating operations for purposes other than addition or subtraction—for binary to decimal conversion, for example. By increasing the number of targets and providing separate electrical connections to each target, a separate and unique output signal can be obtained for each possible combination of values from as many as four binary inputs. Such a target arrangement is shown in Fig. 9.

Referring now to Fig. 9, sixteen targets 63–78 may be arranged in four rows of four targets each. Each target may have a separate electrical connection to a separate output circuit. Four inputs to which electric potentials may be applied are respectively connected to horizontal deflecting plates 79 and 80, and vertical deflecting plates 81 and 82. With zero potential on all deflecting plates, the electron beam may be adjusted to strike target 68. Unit positive potential applied to plate 79 shifts the beam two targets to the left, and unit positive potential applied to plate 81 shifts the beam two targets up. Attenuators represented by capacitors 83 and 84, and capacitors 85 and 86, are provided so that potentials applied to plates 80 and 82 have only one-half the unit value and therefore shift the beam one target to the right and one target down, respectively. It is evident that for every combination of input potentials the electron beam strikes a different target and thereby produces current in a different output circuit.

If potentials representing the digit-values of a four-digit binary number are applied to the four inputs, a unique output is obtained for each of the sixteen possible values represented by the binary number. For example, the potential representing the first digit value from the right may be applied to the input connected to plate 80, the second digit value from the right to the input connected to plate 82, the third from the right to plate 79, and the fourth from the right to plate 81. If potentials are applied which represent the binary number 1001, which has a value of nine, the electron beam will strike target 75. The values represented by the electron beam striking various targets are indicated by decimal-system numbers placed in parentheses on the face of the targets in Fig. 9. The target outputs may be connected to other circuits for converting the indicated values to decimal-system numbers, or for other purposes. Instead of metallic targets, a fluorescent screen may be provided for direct indication of the beam position.

Instead of using electrostatic deflecting plates, input signals can be applied to deflecting coils to deflect the electron beam magnetically. Different arrangements of the targets and deflecting means can be contrived. Those illustrated have been selected for simplicity and ease of construction.

Having described the principles of this invention and the best mode in which we have contemplated applying those principles, we wish it to be understood that the examples shown are illustrative only, and that other means can be employed without departing from the true scope of this invention.

What we claim as new and desire to secure by Letters Patent of the United States is:

1. A binary digital calculating device comprising means to provide an electron beam, three independently operable deflection means for deflecting said beam by discrete amounts, two of said deflection means being arranged to deflect the beam horizontally and the third deflection means being arranged to deflect the beam vertically, so that the beam selectively travels a plurality of fixed paths, means for applying to each of said deflecting means independently electric pulses respectively representing binary digits, a plurality of diagonally interconnected targets respectively positioned to intercept said beam when traveling different ones of such paths, two output circuits, each of said output circuits being coupled to different diagonally interconnected sets of said targets independently, and both of said output circuits being coupled to a remaining target in parallel circuit relationship whereby voltages are produced in either or both of said output circuits selectively responsive to said beam striking different ones of said targets.

2. A binary digital adding device comprising means to provide an electron beam, three independently operable deflection means for deflecting said beam by discrete amounts, two of said deflection means being arranged to deflect the beam horizontally and the third deflection means being arranged to deflect the beam vertically, so that the beam selectively travels a plurality of fixed paths, means for applying to each of said deflecting means independently potentials respectively representing binary digit-values to be added, a plurality of targets diagonally disposed in a plane substantially perpendicular to said beam, a "sum" output circuit, connections between a first one of said targets and the "sum" output circuit to produce a voltage in said "sum" output circuit when said beam travels a path representing potential applied to one deflecting means, a "carry" output circuit, connections between a second one of said targets and the "carry" output circuit to produce a voltage in said "carry" output circuit when said beam travels a path representing potentials applied to two deflecting means, and means including rectifiers connecting a third of said targets to both output circuits to produce voltages in both the "sum" and the "carry" output circuits when the beam travels a path representing potentials applied to three deflecting means.

3. A binary digital subtracting device comprising means to provide an electron beam, three independently operable deflection means for deflecting said beam by discrete amounts, two of such deflecting means acting to deflect the beam in opposite directions and the third deflecting means acting to deflect the beam perpendicular to such directions, means for applying to each of said deflecting means independently potentials representing binary digit-values from the minuend, the subtrahend, and negative carry, respectively, a plurality of targets positioned in the paths of said electron beam, said targets comprising a plurality of electrically conducting target elements arranged in rows and columns with diagonally disposed target elements being electrically interconnected, a "difference" output circuit, connections between a first set of diagonally interconnected targets and the "difference" output circuit to produce a voltage in said "difference" output circuit when such beam travels a path representing a difference of plus one, a "negative carry" output circuit, connections between a second set of diagonally interconnected targets and the "negative carry" output circuit to produce a voltage in said "negative carry" output circuit when such beam travels a path representing a difference of minus two, and means including unidirectional conducting devices connecting a remaining target to both output circuits to produce voltage pulses in both the "difference" and the "negative carry" output circuits when such beam travels a path representing a difference of minus one.

4. A binary calculating device including in combination means for producing an electron beam, a plurality of independently operable electron beam deflection means disposed adjacent the path of said electron beam for horizontally and vertically deflecting the beam whereby it can be caused to selectively travel any one of a plurality of different paths, signal input means coupled to each one of said electron beam deflection means for applying electric signals thereto which are representative of the binary digit values to be treated whereby the electron beam is caused to selectively travel one of the plurality of fixed paths, each path being determined by the instantaneous summation of the electric signals simultaneously applied to all of said electron beam deflection means, a plurality of target electrodes positioned in respective paths of said electron beam, said target electrodes having predetermined target areas arranged in vertical columns and horizontal rows with respect to said deflecting means and positioned to intercept the respective electron beam paths with diagonally disposed target areas being electrically interconnected through conductors of negligible resistivity, two output circuits, one of said output circuits being coupled to one set of diagonally interconnected target electrodes and the remaining output circuit being coupled to another set of diagonally interconnected target electrodes with both of said output circuits being coupled to a remaining target electrode in parallel circuit relationship whereby output signals are produced in either one or both of said output circuits selectively responsive to said electron beam striking different ones of said target electrodes.

5. A binary calculating device including in combination means for producing an electron beam, a plurality of independently operable electron beam deflection means disposed adjacent the path of said electron beam for deflecting the electron beam whereby the same can be caused to selectively travel any one of a plurality of different paths, signal input means coupled to each one of said electron beam deflection means for applying electric signals thereto which are representative of the binary digit values to be treated whereby the electron beam is caused to selectively travel a plurality of fixed paths, each path being determined by the instantaneous summation of the electric signals simultaneously applied to all of said electron beam deflection means, a plurality of electrically conductive targets, each of said targets being positioned in a respective fixed path of said electron beam and representative of a predetermined combination of binary digit values with diagonal ones of the targets representing equal combinations of binary digit values being electrically interconnected, and output circuit means operatively coupled to said targets for deriving an output electric signal indicative of the combined value of the input electric signals, said output circuit means comprising a plurality of impedances, each one of said impedances being operatively coupled to a respective target representative of a predetermined combination of binary digit values, and at least one of said impedances being operatively coupled in parallel circuit relationship with all of said impedances.

6. A binary calculating device including in combination means for producing an electron beam, a plurality of independently operable electron beam deflection means disposed adjacent the path of said electron beam for deflecting the electron beam whereby the same can be caused to selectively travel any one of a plurality of different paths, signal input means coupled to each one of said electron beam deflection means for applying electric signals thereto which are representative of the binary digit values to be treated whereby the electron beam is caused to selectively travel a plurality of fixed paths, each path being determined by the instantaneous summation of the electric signals simultaneously applied to all of said electron beam deflection means, a plurality of electrically conductive targets, each of said targets being positioned in a respective fixed path of said electron beam and representative of a predetermined combination of binary digit values with diagonal ones of the targets representing equal combinations of binary digit values being electrically interconnected, and output circuit means operatively coupled to said targets for deriving an output electric signal indicative of the combined value of the input electric signals, said output circuit means comprising a plurality of impedances, each one of said impedances being operatively coupled to a respective target representative of a predetermined combination of binary digit values, and the particular one of said impedances associated with the target representing the highest value combination of binary digit values being operatively coupled in parallel circuit relationship with the remainder of said impedances, and a plurality of uncoupling elements comprising unidirectional conducting devices, each of said uncoupling elements being connected in series circuit relationship with a respective one of the remainder of said impedances and coupling the same in parallel to said particular impedance.

7. A binary calculating device including in combination means for producing an electron beam, a plurality of independently operable electron beam deflection means disposed adjacent the path of said electron beam for deflecting the electron beam whereby the same can be caused to selectively travel any one of a plurality of different paths, signal input means coupled to each one of said electron beam deflection means for applying electric signals thereto which are representative of the binary digit values to be treated whereby the electron beam is caused to selectively travel a plurality of fixed paths, each path being determined by the instantaneous summation of the electric signals simultaneously applied to all of said electron beam deflection means, a plurality of electrically conductive targets, each of said targets being positioned in a respective fixed path of said electron beam and representative of a predetermined combination of binary digit values with diagonal ones of the targets representing equal combinations of binary digit values being electrically interconnected, and output circuit means operatively coupled to said targets for deriving an output electric signal indicative of the combined value of the input electric signals, said output circuit means comprising a plurality of impedances, each one of said impedances being operatively coupled to a respective target representative of a predetermined combination of binary digit values and at least one of said impedances being operatively coupled in parallel circuit relationship with the remainder of said impedances, and feedback coupling means for operatively coupling at least one of the remainder of said impedances back to the input of one of said electron beam deflection means.

8. A binary calculating device including in combination means for producing an electron beam, a plurality of independently operable electron beam deflection means disposed adjacent the path of said electron beam for deflecting the electron beam whereby the same can be caused to selectively travel any one of a plurality of different paths, signal input means coupled to each one of said electron beam deflection means for applying electric signals thereto which are representative of the binary digit values to be treated whereby the electron beam is caused to selectively travel a plurality of fixed paths, each path bing determined by the instantaneous summation of the electric signals simultaneously applied to all of said electron beam deflection means, a plurality of electrically conductive targets, each of said targets being positioned in a respective fixed path of said electron beam and representative of a predetermined combination of binary digit values with diagonal ones of the targets representing equal combinations of binary digit values being electrically interconnected, and output circuit means operatively coupled to said targets for deriving an output electric signal indicative of the combined value of the input electric signals, said output circuit means comprising a plurality of impedances, each one of said impedances being operatively coupled to a respective target representative of a predetermined combination of binary digit values, and at least one of said impedances being operatively coupled in parallel circuit relationship with the remainder of said impedances, a delay device, and feedback coupling means for operatively coupling at least one of the remainder of said impedances back through said delay device to the input of one of said electron beam deflection means.

9. A binary calculating device including in combination means for producing an electron beam, a plurality of independently operable electron beam deflection means disposed adjacent the path of said electron beam for deflecting the electron beam whereby the same can be caused to selectively travel any one of a plurality of different paths, signal input means coupled to each one of said electron beam deflection means for applying electric signals thereto which are representative of the binary digit values to be treated whereby the electron beam is caused to selectively travel a plurality of fixed paths, each path being determined by the instantaneous summation of the electric signals simultaneously applied to all of said electron beam deflection means, a plurality of electrically conductive secondary electron emissive targets, each of said targets being positioned in a respective fixed path of said electron beam and representative of a predetermined combination of binary digit values with diagonal ones of the targets representing equal combinations of binary digit values being electrically interconnected, a collecting electrode member disposed adjacent said targets for collecting the secondary electrons emitted thereby, and output circuit means comprising a plurality of impedances, each one of said impedances being operatively coupled to a respective target representative of a predetermined combination of binary digit values, and the particular one of said impedances associated with the target representing the highest value combination of binary digit values being operatively coupled in parallel circuit relationship with the remainder of said impedances, a plurality of uncoupling elements comprising unidirectional conducting devices, each one of said uncoupling elements being connected in series circuit relationship with a respective one of the remainder of said impedances and coupling the same in parallel to said particular impedance, a delay device, and feedback coupling means for operatively coupling the particular one of said impedances associated with the target representing an intermediate value combination of binary digit values back through said delay device to the input of one of said electron beam deflection means.

References Cited in the file of this patent

UNITED STATES PATENTS

| Number | Name | Date |
|---|---|---|
| 2,202,511 | Andrieu | May 28, 1940 |
| 2,324,851 | Koch | July 20, 1943 |
| 2,417,450 | Sears | Mar. 18, 1947 |
| 2,424,289 | Snyder et al. | July 22, 1947 |

| Number | Name | Date |
|---|---|---|
| 2,428,351 | Ayres | Oct. 7, 1947 |
| 2,429,227 | Herbst | Oct. 21, 1947 |
| 2,435,841 | Morton et al. | Feb. 10, 1948 |
| 2,445,964 | Owen | July 27, 1948 |
| 2,498,081 | Joel | Feb. 21, 1950 |
| 2,517,712 | Riggen | Aug. 8, 1950 |
| 2,522,291 | Morrison | Sept. 12, 1950 |
| 2,540,016 | Sunstein | Jan. 30, 1951 |
| 2,568,449 | Hansen | Sept. 18, 1951 |